United States Patent
Zhu et al.

(10) Patent No.: US 12,020,142 B2
(45) Date of Patent: Jun. 25, 2024

(54) NEURAL NETWORK MODEL DEPLOYMENT METHOD, PREDICTION METHOD AND RELATED DEVICE

(71) Applicant: Tencent Technology (Shenzhen) Company Limited, Shenzhen (CN)

(72) Inventors: Xiao Long Zhu, Shenzhen (CN); Yi Tong Wang, Shenzhen (CN); Kai Ning Huang, Shenzhen (CN); Lijian Mei, Shenzhen (CN); Shenghui Huang, Shenzhen (CN); Jingmin Luo, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 493 days.

(21) Appl. No.: 16/659,888

(22) Filed: Oct. 22, 2019

(65) Prior Publication Data
US 2020/0050939 A1 Feb. 13, 2020

Related U.S. Application Data
(63) Continuation of application No. PCT/CN2018/116958, filed on Nov. 22, 2018.

(30) Foreign Application Priority Data
Dec. 13, 2017 (CN) .......................... 201711330928.6

(51) Int. Cl.
*G06N 20/00* (2019.01)
*G06N 3/063* (2023.01)
(Continued)

(52) U.S. Cl.
CPC .............. *G06N 3/063* (2013.01); *G06N 3/08* (2013.01); *G06N 5/046* (2013.01); *G06N 20/00* (2019.01);
(Continued)

(58) Field of Classification Search
CPC .......... G06N 3/08; G06N 20/00; G06N 5/046; G06T 1/20
See application file for complete search history.

(56) References Cited

U.S. PATENT DOCUMENTS
2017/0068889 A1  3/2017  Fougner et al.

FOREIGN PATENT DOCUMENTS
CN   104964719 A   10/2015
CN   105205558 A   12/2015
(Continued)

OTHER PUBLICATIONS
Sharma, H., et al From High-Level Deep Neural Models to FPGAs, [retrieved Jan. 29, 2022]. Retrieved from Internet:<https://ieeexplore.ieee.org/abstract/document/7783720> (Year: 2016).*
(Continued)

*Primary Examiner* — Miranda M Huang
*Assistant Examiner* — Bart I Rylander
(74) *Attorney, Agent, or Firm* — Crowell & Moring LLP

(57) ABSTRACT

Embodiments of this application provide a neural network model deployment method, a prediction method and a device. The described features can implement deployment of a neural network model to improve the universality of the deployment of the neural network model to the terminal device by obtaining a layer definition and an operation parameter of each network layer of an initial neural network model, executing a target network layer corresponding to the network layers, applying relational connections amongst the target network layers using a net class, converting the operation parameters into a preset format, obtaining a target operation parameter based on the preset format, loading a corresponding target operation parameter in the target network layer, and obtaining a target neural network model based on the target operation parameter.

14 Claims, 13 Drawing Sheets

(51) Int. Cl.
    *G06N 3/08*     (2023.01)
    *G06N 5/046*    (2023.01)
    *G06T 1/20*     (2006.01)
    *G06V 10/764*   (2022.01)
    *G06V 10/82*    (2022.01)

(52) U.S. Cl.
    CPC .............. *G06T 1/20* (2013.01); *G06V 10/764* (2022.01); *G06V 10/82* (2022.01)

(56) References Cited

FOREIGN PATENT DOCUMENTS

| | | |
|---|---|---|
| CN | 106295803 A | 1/2017 |
| CN | 107329936 A | 11/2017 |
| CN | 109919308 A | 6/2019 |

OTHER PUBLICATIONS

Jia, Y., et al Caffe: Convolutional Architecture for Fast Feature Embedding, [retrieved Jan. 29, 2022]. Retrieved from Internet: < https://dl.acm.org/doi/abs/10.1145/2647868.2654889> (Year: 2014).*

Kim, H., et al, Performance Analysis of CNN Frameworks for GPUs, [retrieved Jun. 22, 2022]. Retrieved from Internet:<https://ieeexplore.ieee.org/abstract/document/7975270> (Year: 2017).*

Wang, D. et al, PipeCNN: An OpenCL-Based FPGA Accelerator for Large-Scale Convolution Neuron Networks, [retrieved Oct. 17, 2022]. Retrieved from Internet:< https://arxiv.org/abs/1611.02450> (Year: 2016).*

Motamedi, M., et al, Fast and Energy-Efficient CNN Inference on IoT Devices, [received Jun. 28, 2023]. Retrieved from Internet:<https://arxiv.org/abs/1611.07151> (Year: 2016).*

International Search Report and Written Opinion with English Translation for International Application No. PCT/CN2018/116958 dated Feb. 25, 2019; 12 pages.

Weitzenfeld, A. et al., "A concurrent Object-Oriented Framework for the Simulation of Neural Networks", Center for Neural Engineering, University of Southern California, Los Angeles, CA 90089-2520, 5 pages.

Rogers, Joey "Object-Oriented Neural Networks in C++", Oct. 29, 1996, pp. 29 and 31.

Extended Search Report on European application 18887768.2, dated Feb. 2, 2021, 10 pages.

Second Office Action issued on Chinese application 201711330928.6 on Jul. 4, 2022, 3 pages.

* cited by examiner

```
1.  for(oc=0;oc<outputChannes;oc++)
2.  {
3.      for (y = 0; y < outputHeight; y++)
4.      {
5.          for (x = 0; x < outputWidth; x++)
6.          {
7.              calc_output(oc,y,x)
8.          }//loop 3
9.      }//loop2
10. }//loop 1
11.
12. calc_output(oc,y,x):
13. sum = 0;
14. for(ic=0;ic<inputChannels;ic++){
15.     for(j=0;j<filterHeight;j++){
16.         for(i=0;i<filterWidth;i++){
17.             pixel = input[y-filterHeight/2+j][x-filterWidth/2+i][ic];
18.             w = filter[oc][j][i][ic];
19.             sum += pixel*w;
20.         }//loop 6
21.     }//loop 5
22. }//loop 4
23.output[y][x][oc] = sum;
```

FIG. 6

```
1.  kernel convolution( input,
2.                      output,
3.                      filter,
4.                      uint3 gid)
5.  {
6.      x=gid.x;
7.      y=gid.y;
8.      oc=gid.z;
9.
10.     sum = 0;
11.     for(ic=0;ic<inputChannels;ic++){
12.         for(j=0;j<filterHeight;j++){
13.             for(i=0;i<filterWidth;i++){
14.                 pixel = input[y-filterHeight/2+j][x-filterWidth/2+i][ic];
15.                 w = filter[oc][j][i][ic];
16.                 sum += pixel*w;
17.             }//loop 6
18.         }//loop 5
19.     }//loop 4
20.     output[y][x][oc] = sum;
21. }
```

FIG. 7

```
1.  kernel convolution3x3( input,
2.                         output,
3.                         filter,
4.                         uint3 gid)
5.  {
6.      x=gid.x;
7.      y=gid.y;
8.      oc=gid.z;
9.
10.     for(ic=0;ic<inputChannels;ic++){
11.         pixel_line0[3];
12.         pixel_line1[3];
13.         pixel_line2[3];
14.         read pixel_line0[3];
15.         read pixel_line1[3];
16.         read pixel_line2[3];
17.
18.         w[9];
19.         read w[9];
20.
21.         calc_output(oc,y,x)
22.         read_new_line()
23.         calc_output(oc,y+1,x)
24.         read_new_line()
25.         ...
26.         calc_output(oc,y+7,x)
27.     }//loop 4
28. }
29.
30. calc_output(oc,y,x){
31.     sum = pixel_line0[0]*w[0] + pixel_line0[1]*w[1] + pixel_line0[2]*w[2]
32.         + pixel_line1[0]*w[3] + pixel_line1[1]*w[4] + pixel_line1[2]*w[5]
33.         + pixel_line2[0]*w[6] + pixel_line2[1]*w[7] + pixel_line2[2]*w[8];
34.     output[y][x][oc] = sum;
35. }
36.
37. read_new_line(){
38.     pixel_line0 = pixel_line1;
39.     pixel_line1 = pixel_line2;
40.     read pixel_line2[3];
41. }
```

FIG. 8

NEURAL NETWORK MODEL DEPLOYMENT METHOD, PREDICTION METHOD AND RELATED DEVICE

RELATED APPLICATION

This application claims priority to International Patent Application No. PCT/CN2018/116958, filed on Nov. 22, 2018 which claims priority to Chinese Patent Application No. 201711330928.6, filed with the Chinese Patent Office on Dec. 13, 2017, and entitled "NEURAL NETWORK MODEL DEPLOYMENT METHOD, PREDICTION METHOD AND RELATED DEVICE", the entirety of all of which are hereby incorporated by reference herein.

FIELD OF THE TECHNOLOGY

This application relates to the field of data processing technologies, and in particular, to a neural network model deployment method, a prediction method and a device.

BACKGROUND OF THE DISCLOSURE

A neural network, in particular, a convolutional neural network (CNN), as an important branch of deep learning, has become a research hotspot in the fields of speech analysis and image recognition. Actual application of the neural network is generally divided into neural network model training and neural network model prediction.

Neural network model training may be understood as learning and adjusting parameters of a neural network based on a large amount of sample data to obtain a neural network model having a required function. Neural network model may be understood as performing computing on prediction input data based on a trained neural network model to determine a prediction result (such as classification or recognition result), thus implementing a required function.

Generally, neural network model training is performed and deployed on a server. Therefore, neural network model prediction requires coordination by a terminal device and the server. For example, after training of a neural network model is finished, prediction input data is obtained by the terminal device and is submitted to the server. Neural network model prediction is performed by the neural network model deployed in the server, which undoubtedly causes certain difficulties for satisfying the speed and real-time performance required by the neural network model. Therefore, how to improve a deployment method of the neural network model to provide a basis for improving the speed and real-time performance of neural network model prediction has become a problem needing to be considered by a person skilled in the art.

SUMMARY

In view of this, embodiments of this application provide a neural network model deployment method, a prediction method and a device, to deploy a neural network model on a terminal device, thus providing a basis for improving the speed and real-time performance of neural network model prediction; moreover, the provided neural network model deployment method has high universality.

To achieve the foregoing objective, an embodiment of this application provides the following technical solution:

A neural network model deployment method, applied to a terminal device, including: reading an initial neural network model to obtain a layer definition of each network layer of the initial neural network model and an operation parameter of each network layer; implementing, by using a Layer class, a target network layer corresponding to each network layer in the terminal device separately according to the layer definition of each network layer, so that each target network layer is inherited from the Layer class; connecting the target network layers by using a Net class; converting the operation parameter of each network layer into a predetermined format, to obtain a target operation parameter of each network layer; and loading a corresponding target operation parameter in the target network layer corresponding to each network layer separately according to the target operation parameter of each network layer, to obtain a target neural network model deployed in the terminal device.

An embodiment of this application further provides a neural network model prediction method, applied to a terminal device, including: obtaining prediction input data through a data input apparatus of the terminal device; invoking a neural network model pre-deployed in the terminal device; and using the prediction input data as an input of the neural network model, and processing the prediction input data by using the neural network model to obtain a prediction result.

An embodiment of this application further provides a neural network model deployment apparatus, applied to a terminal device, including: a reading module, configured to read an initial neural network model to obtain a layer definition of each network layer of the initial neural network model and an operation parameter of each network layer; a target network layer implementation module, configured to implement, by using a Layer class, a target network layer corresponding to each network layer in the terminal device separately according to the layer definition of each network layer, so that each target network layer is inherited from the Layer class; a network layer connection module, configured to connect the target network layers by using a Net class; a format conversion module, configured to convert the operation parameter of each network layer into a predetermined format, to obtain a target operation parameter of each network layer; and a parameter loading module, configured to load a corresponding target operation parameter in the target network layer corresponding to each network layer separately according to the target operation parameter of each network layer, to obtain a target neural network model deployed in the terminal device.

An embodiment of this application further provides a neural network model prediction apparatus, applied to a terminal device, including: a data obtaining module, configured to obtain prediction input data through a data input apparatus of the terminal device; a model invoking module, configured to invoke a neural network model pre-deployed in the terminal device; and a model processing module, configured to use the prediction input data as an input of the neural network model, and process the prediction input data by using the neural network model, to obtain a prediction result.

An embodiment of this application further provides a terminal device, including: at least one memory and at least one graphics processing unit, the memory storing a program, and in a case that the graphics processing units invokes the program stored in the memory, the following operations are implemented: reading an initial neural network model to obtain a layer definition of each network layer of the initial neural network model and an operation parameter of each network layer; implementing, by using a Layer class, a target network layer corresponding to each network layer in the terminal device separately according to the layer definition of each network layer, so that each target network layer is inherited from the Layer class; connecting the target network layers by using a Net class; converting the operation parameter of each network layer into a predetermined format, to obtain a target operation parameter of each network layer; and loading a corresponding target operation parameter in the target network layer corresponding to each network layer separately according to the target operation parameter of each network layer, to obtain a target neural network model deployed in the terminal device.

An embodiment of this application further provides a storage medium, the storage medium storing a program suitable to be executed by a graphics processing unit, and the program, when executed by the graphics processing unit, implementing the operations of the foregoing neural network model deployment method.

An embodiment of this application further provides a terminal device, including: at least one memory and at least one graphics processing unit, the memory storing a program, and in a case that the graphics processing unit invokes the program stored in the memory, the following operations are implemented: obtaining prediction input data through a data input apparatus of the terminal device; invoking a neural network model pre-deployed in the terminal device; and using the prediction input data as an input of the neural network model, and processing the prediction input data by using the neural network model to obtain a prediction result.

Based on the foregoing technical solution, in the neural network model deployment method and the device provided in the embodiments of this application, each network layer of an initial neural network model is redefined by using a Layer class based on a defined framework body of neural network models which is applicable to the terminal device, to obtain each target network layer inherited from the Layer class; and the target network layers are connected by using a Net class, and a corresponding target operation parameter converted into a predetermined format is loaded in each target network layer to obtain a target neural network model. The Layer class is an abstract class. In the embodiments of this application, the Layer class is used as a base class of each target network layer of the target neural network model. In this way, for initial neural network models trained by using different learning frameworks, the framework body provided by the embodiments of this application can be used when the initial neural network models are deployed into the terminal device. Each network layer of the initial neural network model is redefined by using the Layer class as the base class of the target network layers, and the re-defined target network layers are connected by using the Net class, thus realizing general deployment of initial neural network models trained by using different learning frameworks into the terminal device. Therefore, during neural network model prediction, the neural network model prediction may be directly implemented based on the neural network model deployed in the terminal device, thus providing a basis for improving the speed and real-time performance of neural network model prediction. Moreover, the embodiments of this application can implement general deployment of initial neural network models trained by using different learning frameworks into the terminal device, thus reducing the usage limitation of deployment of the initial neural network models to the terminal device and improving the universality of neural network model deployment.

BRIEF DESCRIPTION OF THE DRAWINGS

To describe the technical solutions in the embodiments of this application or in the related technology more clearly, the following briefly describes the accompanying drawings required for describing the embodiments or the related technology. Apparently, the accompanying drawings in the following description show merely the embodiments of this application, and a person of ordinary skill in the art may still derive other drawings from these accompanying drawings without creative efforts.

FIG. 6 is a schematic diagram of a part of pseudocode of a conventional convolution calculation method;

FIG. 7 is a schematic diagram of a part of pseudocode of a kernel function of a GPU according to an embodiment of this application;

FIG. 8 is a schematic diagram of another part of pseudocode of a kernel function of a GPU according to an embodiment of this application;

DETAILED DESCRIPTION

The following clearly and completely describes the technical solutions in the embodiments of this application with reference to the accompanying drawings in the embodiments of this application. Apparently, the described embodiments may be merely some but not all of the embodiments of this application. Other embodiments obtained by a person of ordinary skill in the art based on the embodiments of this application without creative efforts shall fall within the protection scope of this application.

According to a neural network model deployment method provided by the embodiments of this application, a server-trained neural network model can be deployed in a terminal device. Moreover, general deployment of neural network models, which are trained based on different learning frameworks by a server, to the terminal device can be implemented. For example, general deployment of neural network models trained based on different learning frameworks by the server, for example, Tensorflow (where Tensorflow is an artificial intelligence learning system developed by Google) and caffe (which is a convolutional neural network framework), to the terminal device may be implemented. In this way, when a neural network model is deployed into the terminal device, the terminal device does not need to install a mobile-version learning framework corresponding to a learning framework of the server-trained neural network model.

To improve the universality of deployment of a neural network model into a terminal device, the inventor of this application defines a novel framework body of neural network models which is applicable to the terminal device. The framework body redefines each network layer of the neural network model by using a Layer class, that is, each network layer of the neural network model may be inherited from the Layer class, and a specific method of each network layer is implemented by using the Layer class. Moreover, the network layers of the neural network model that are inherited from the Layer class may be connected through a Net (network) class, to form a network structure of the neural network model. The Layer class is an abstract class. In the embodiments of this application, the Layer class is used as a base class for constructing network layers of a neural network model. In this way, for network models trained by using different learning frameworks, the framework body provided by the embodiments of this application can be used when the initial neural network models are deployed into the terminal device. Each network layer of the neural network model is redefined by using the Layer class as the base class, and the network layers are connected by using the Net class, thus realizing general deployment of neural network models trained by using different learning frameworks into the terminal device.

Figure 1:
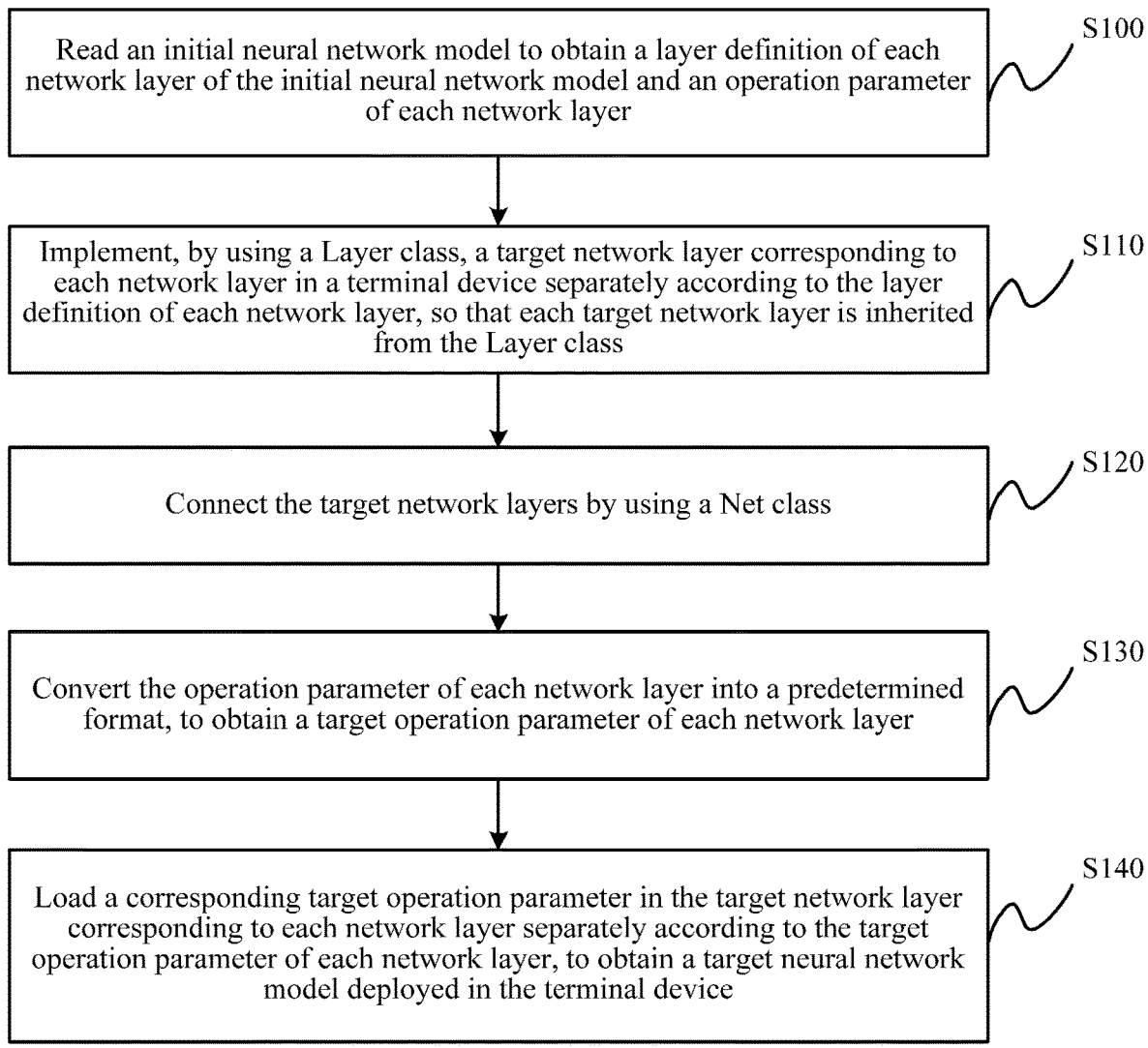
FIG. 1 is a flowchart of a neural network model deployment method according to an embodiment of this application.

Based on this concept, when the server-trained neural network model is deployed into the terminal device, FIG. 1 is a flowchart of a neural network model deployment method according to an embodiment of this application. The method may be applied to the terminal device, and in particular, to a terminal device with an IOS operating system (where the IOS operating system is Apple's mobile operating system). For example, the method may be specifically performed a graphics processing unit (GPU) of an IOS terminal. Obviously, the neural network model deployment method provided by the embodiments of this application is not limited to being applied to the terminal device with the IOS operating system, and may also be applied to a terminal device with another operating system. The GPU of the terminal device performs deployment of the neural network model.

Referring to FIG. 1, a neural network model deployment method provided by an embodiment of this application may include:

Step S100. Read an initial neural network model to obtain a layer definition of each network layer of the initial neural network model and an operation parameter of each network layer.

Optionally, the initial neural network model may be considered as a neural network model needing to be deployed to a terminal device. In an optional manner, the initial neural network model may be a neural network model trained by a server based on a particular learning framework, for example, a neural network model trained by the server based on a learning framework such as Tensorflow. The Tensorflow learning framework is an artificial intelligence learning system developed by Google.

In another optional manner, the initial neural network model may be a neural network model that is already deployed in a terminal device and needs to be re-deployed based on a framework body provided by the embodiment of this application. For example, a neural network model, which is deployed in the terminal device through a mobile-version learning framework by the terminal device, may be re-deployed by using the neural network model deployment method provided by the embodiment of this application, so that the neural network model deployed in the terminal device has features of the framework body provided by the embodiment of this application. For example, the neural network model, which is deployed to the terminal device through a mobile-version learning framework Tensorflow by the terminal device, may be re-deployed by using the neural network model deployment method provided by the embodiment of this application.

After an initial neural network model needing to be deployed into the terminal device is determined, in the embodiment of this application, the initial neural network model can be read, to obtain the layer definition of each network layer of the initial neural network model, and the operation parameter of each network layer.

Optionally, in the embodiment of this application, a network structure of the initial neural network model may be read to obtain the layer definition of each network layer. The network structure of the initial neural network model generally includes a plurality of interconnected network layers of multiple types. For example, if the initial neural network model is of a CNN network form, an optional network structure of the CNN may include: a normalization layer (BatchNorm), a convolution layer (Convolution), a deconvolution layer (Deconvolution), an activation layer (e.g., rectified linear unit (ReLU)), an additive layer (e.g., Eltwise layer), an activation layer with parameters (e.g., parametric ReLu (PReLU)), a downsampling layer (Pooling), a scaling layer (Resize), a depthwise separable convolution layer (Depthwise Convolution), and a splicing layer (Concat), and the like. Obviously, the example of the CNN network structure herein is optional, and settings of a specific network structure may further be adjusted according to actual needs.

In the embodiment of this application, by reading the network structure of the initial neural network model, the layer definition of each network layer of the initial neural network model obtained. The layer definition of one network layer can describe layer attributes of the network layer, including name information, class information, and initialization information of the network layer.

Different network layers have different name information. The network layers can be distinguished according to the name information. For example, the name information may be a network layer name that is set for the network layer, and a layer number of the network layer in the initial neural network model. The class information is used for describing the class of the network layer, for example, a normalization layer, a convolution layer, a deconvolution layer, and a pooling layer. The initialization information is used for describing an operation parameter of an initialization layer of the network layer.

Optionally, in the embodiment of this application, the operation parameter of each network layer may be read from each network layer of the initial neural network model. The operation parameter of each network layer of the initial neural network model may be considered as a weight of each network layer of the initial neural network model. The operation parameter of each network layer of the initial neural network model determines functions of the initial neural network model. During the process of training the neural network model, what is learned and adjusted is mainly the operation parameters of each network layer of the neural network model.

Step S110. Implement, by using a Layer class, a target network layer corresponding to each network layer in the terminal device separately according to the layer definition of each network layer, so that each target network layer is inherited from the Layer class.

Optionally, inheritance is a method in programming languages. If class A is inherited from class B, class B may be referred to as a base class, class A may be referred to as a derived class, and class A may obtain attributes and methods of class B. In the embodiment of this application, when the initial neural network model is deployed into the terminal device, each network layer of the initial neural network model may be redefined, and the target network layer corresponding to each network layer is obtained in the terminal device. The target network layer may be considered as a network layer in the target neural network model. The target neural network model may be considered as a deployment result obtained after the initial neural network model is deployed into the terminal device based on the neural network model deployment method provided by the embodiment of this application. Correspondingly, a network layer of the initial neural network model may correspond to a target network layer of the target neural network model. When the network layers of the initial neural network model are redefined to obtain the target network layers corresponding to the network layers, the inheritance method may be used in the embodiment of this application, and the target network layers corresponding to the network layers are implemented by using the Layer class, so that the redefined target network layers are all inherited from the Layer class.

Optionally, in an example, the layer definition of a network layer of the initial neural network model may include: name information, class information, initialization information and the like of the network layer. Correspondingly, the Layer class may be preset with a name attribute, a Layer class attribute (Layer class), and an initialization method (for example, an init method).

Optionally, in an optional implementation, the process of implementing, by using a Layer class, a target network layer corresponding to each network layer in the terminal device separately according to the layer definition of each network layer, so that each target network layer is inherited from the Layer class may include: for any network layer, adjusting, by using the Layer class as a base class in the terminal device, a preset name attribute of the Layer class according to the name information of the network layer, adjusting a preset Layer class attribute of the Layer class according to the class information of the network layer, and performing, according to the initialization information of the network layer, an initialization operation by using a preset initialization method of the Layer class, to obtain the target network layer corresponding to each network layer, so that each obtained target network layer is a derived class of the Layer class. Therefore, each network layer in the initial neural network model is processed in this manner by using the Layer class, so that the target network layer corresponding to each network layer may be implemented.

Step S120. Connect the target network layers by using a Net class.

Optionally, after the target network layers corresponding to the network layers of the initial neural network model are obtained, the structure of each network layer in the initial neural network model is redefined by using the Layer class as a base class, to obtain each redefined target network layer. In the embodiment of this application, according to a connecting structure of the network layers of the initial neural network model, the target network layers may be connected by using the Net class, to form a connecting structure of the target network layers of the target neural network model. Moreover, the connecting structure of the target network layers of the target neural network model corresponds to the connecting structure of the network layers of the initial neural network model.

Optionally, for ease of connection, for example, the initial neural network model has network layers A1, B1, and C1, the network layer A1 is connected to the network layer B1, and the network layer B1 is connected to the network layer C1. In this case, after a target network layer A2 corresponding to the network layer A1, a target network layer B2 corresponding to the network layer B1, and a target network layer C2 corresponding to the network layer C1 are implemented through step S110 by using the Layer class, the target network layer A2, the target network layer B2, and the target network layer C2 are connected by using the Net class according to the connecting structure of the network layers A1, B1, and C1 in the initial neural network model, so that the target network layer A2 is connected to the target network layer B2, and the target network layer B2 is connected to the target network layer C2, thereby obtaining the connecting structure of the target network layers corresponding to the connecting structure of the network layers of the initial neural network model.

Step S130. Convert the operation parameter of each network layer into a predetermined format, to obtain a target operation parameter of each network layer.

After the target network layers are implemented and the target network layers are connected by using the Net class to form the network layer structure of the target neural network model through the foregoing steps, in the embodiment of this application, the operation parameter of each target network layer further needs to be loaded, so that the target neural network model has functions corresponding to the initial neural network model.

Based on this, in the embodiment of this application, the read operation parameter of each network layer of the initial neural network model may be converted into a predetermined format, to obtain the target operation parameter of each network layer. The target operation parameter of a network layer may be considered as an operation parameter needing to be loaded to a corresponding target network layer. Optionally, the predetermined format may be a format of the framework body of neural network models which is provided by the embodiments of this application and applicable to the terminal device, and the specific format type may be set according to an actual situation.

Step S130 may be performed after step S100, is not necessarily performed after step S120.

Step S140. Load a corresponding target operation parameter in the target network layer corresponding to each network layer separately according to the target operation parameter of each network layer, to obtain a target neural network model deployed in the terminal device.

Optionally, for the target operation parameter of a network layer, in the embodiment of this application, the target operation parameter may be loaded in the target network layer corresponding to the network layer to obtain a target network layer loaded with the corresponding target operation parameter. In this case, the corresponding target operating parameter is loaded in each target network layer loaded. On the basis that the redefined target network layers are obtained in the terminal device and the target network layers are connected, the target operation parameter of each target network layer is loaded to obtain the target neural network model. Therefore, based on the neural network model deployment method provided by the embodiment of this application, the deployment of the initial neural network model to the terminal device is completed, and the obtained deployment result is the target neural network model.

The neural network model deployment method provided in the embodiment of this application includes: reading an initial neural network model, to obtain a layer definition of each network layer of the initial neural network model and an operation parameter of each network layer; implementing, by using a Layer class, a target network layer corresponding to each network layer in the terminal device separately according to the layer definition of each network layer, so that each target network layer is inherited from the Layer class; connecting the target network layers by using a Net class; converting the operation parameter of each network layer into a predetermined format, to obtain a target operation parameter of each network layer; and loading a corresponding target operation parameter in the target network layer corresponding to each network layer separately according to the target operation parameter of each network layer, to obtain a target neural network model deployed in the terminal device.

In the neural network model deployment method provided in the embodiment of this application, based on a defined framework body of neural network models which is applicable to the terminal device, each network layer of the initial neural network model is redefined by using the Layer class, to obtain each target network layer inherited from the Layer class. Moreover, the target network layers are connected through the Net class, and a corresponding target operation parameter that has been converted into the predetermined format is loaded in each target network layer to obtain the target neural network model. The Layer class is an abstract class. In the embodiment of this application, the Layer class is used as a base class of each target network layer of the target neural network model. In this way, for initial neural network models trained by using different learning frameworks, the framework body provided by the embodiment of this application can be used when the initial neural network models are deployed into the terminal device. Each network layer of the initial neural network model is redefined by using the Layer class as the base class of the target network layers, and the re-defined target network layers are connected by using the Net class, thus realizing general deployment of initial neural network models trained by using different learning frameworks into the terminal device. Therefore, during neural network model prediction, the neural network model prediction may be directly implemented based on the neural network model deployed in the terminal device, thus providing a basis for improving the speed and real-time performance of neural network model prediction. It is unnecessary to transmit data to a server through a network, thus avoiding a network delay, reducing hardware costs, avoiding the problem of high load of the server. In addition, it is unnecessary to connect the terminal device to a network, thus expanding an application range. Moreover, the embodiment of this application can implement general deployment of initial neural network models trained by using different learning frameworks into the terminal device, thus reducing the usage limitation of deployment of the initial neural network models to the terminal device and improving the universality of neural network model deployment.

Optionally, the name attribute, the Layer class attribute and the initialization method may be preset in the Layer class to implement redefinition of the target network layer corresponding to each network layer. Further, a parameter loading method (for example, a load model) may be preset in the Layer class, to implement the loading of the target operation parameter in the target network layer.

Figure 2:
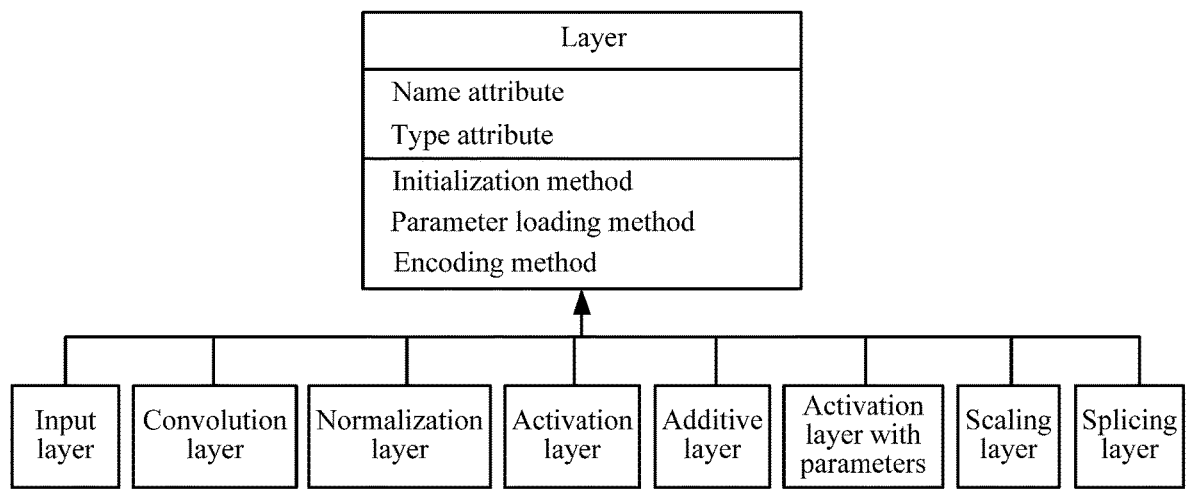
FIG. 2 is a schematic diagram of CNN network layers inherited from a Layer class.

In an example, the initial neural network model is in a CNN format, and FIG. 2 shows an example of CNN network layers inherited from the Layer class. As shown in FIG. 2, an input layer (Identify), a convolution layer (Convolution), a normalization layer (Batch Norm), an activation layer (ReLU), an additive layer (Eltwise), an activation layer with parameters (PReLU), a scaling layer (Resize), and a splicing layer (Concat) in the initial neural network model may be all inherited from the Layer class. Each network layer of the foregoing initial neural network model is redefined by using the name attribute (var name), the Layer class attribute (var class), and the initialization method (init) preset in the Layer class, to obtain each target network layer. Loading of the target operation parameter of each target network layer is implemented by using the parameter loading method (load model) preset in the Layer class. Further, after the target neural network model is obtained, a computing task of the current layer may be encoded and submitted to a GPU by using an encoding (encode) method in the Layer class.

Figure 3:
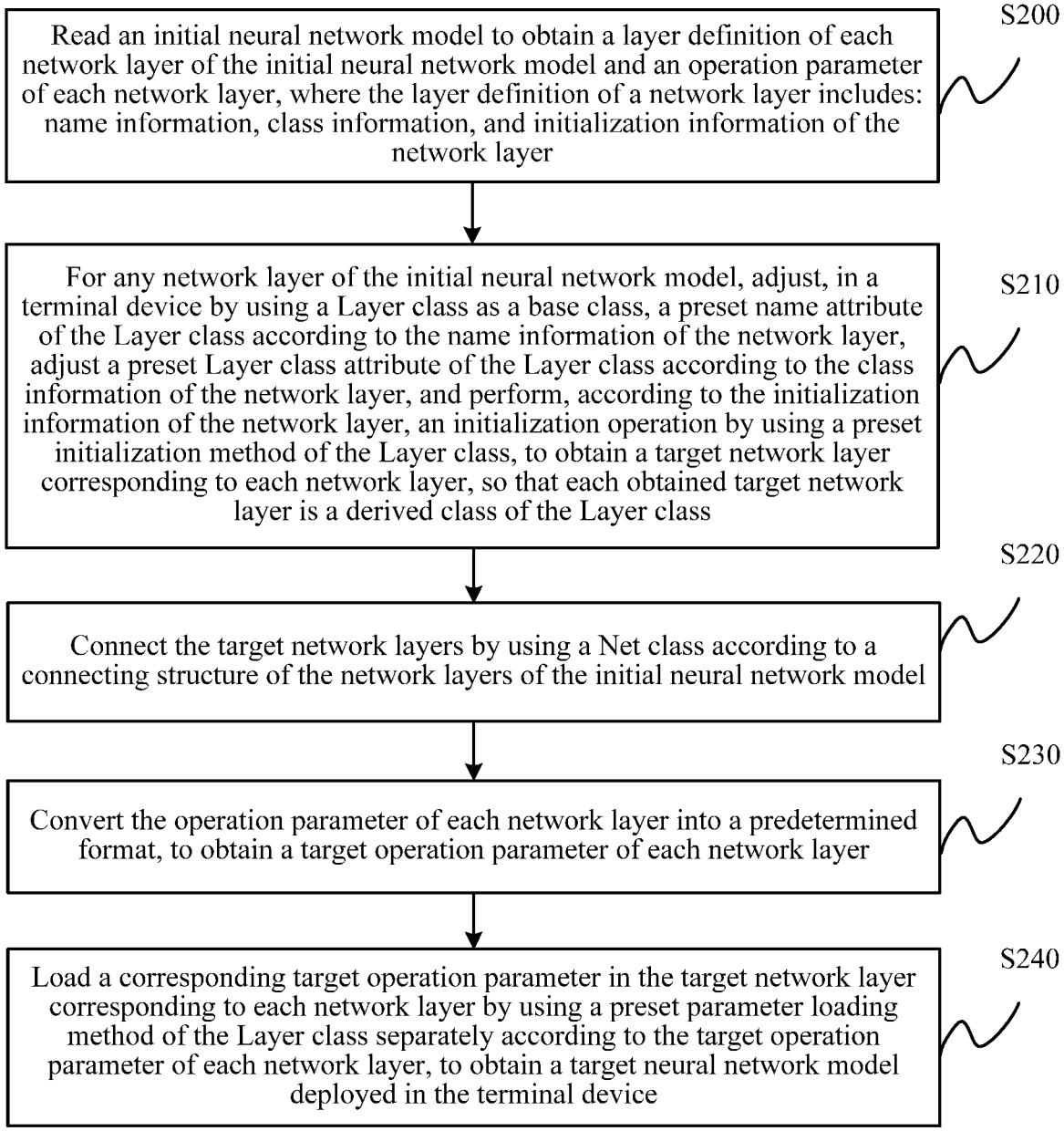
FIG. 3 is another flowchart of a neural network model deployment method according to an embodiment of this application.

Optionally, FIG. 3 is another flowchart of a neural network model deployment method according to an embodiment of this application. Referring to FIG. 3, the method may include:

Step S200. Read an initial neural network model to obtain a layer definition of each network layer of the initial neural network model and an operation parameter of each network layer, where the layer definition of a network layer includes: name information, class information, and initialization information of the network layer.

Step S210. For any network layer of the initial neural network model, adjust, in a terminal device by using a Layer class as a base class, a preset name attribute of the Layer class according to the name information of the network layer, adjust a preset Layer class attribute of the Layer class according to the class information of the network layer, and perform, according to the initialization information of the network layer, an initialization operation by using a preset initialization method of the Layer class, to obtain a target network layer corresponding to each network layer, so that each obtained target network layer is a derived class of the Layer class.

Step S220. Connect the target network layers by a Net class according to a connecting structure of the network layers of the initial neural network model.

Optionally, after the target network layers are connected by using the Net class, a connecting structure of the target network layers corresponds to the connecting structure of the network layers of the initial neural network model.

Step S230. Convert the operation parameter of each network layer into a predetermined format, to obtain a target operation parameter of each network layer.

Step S240. Loading a corresponding target operation parameter in the target network layer corresponding to each network layer by using a preset parameter loading method of the Layer class separately according to the target operation parameter of each network layer, to obtain a target neural network model deployed in the terminal device.

Optionally, in addition to connecting the target network layers, the Net class can also implement the following functions:

adding a network layer to the neural network model; correspondingly, in the embodiment of this application, one network layer may be added to the target neural network model by using a network layer adding method (for example, an add Layer method) preset in the Net class, and the added network layer is also inherited from the Layer class;

reading and loading a parameter required for operating the neural network model; correspondingly, in the embodiment of this application, the parameter required for operating the neural network model may be read and loaded by using a parameter reading method (for example, a load model method) preset in the Net class; and operating the neural network model to perform forward prediction; correspondingly, in the embodiment of this application, the target neural network model may be operated by using a prediction method (for example, a forward method) preset in the Net, to perform forward prediction.

Figure 4:
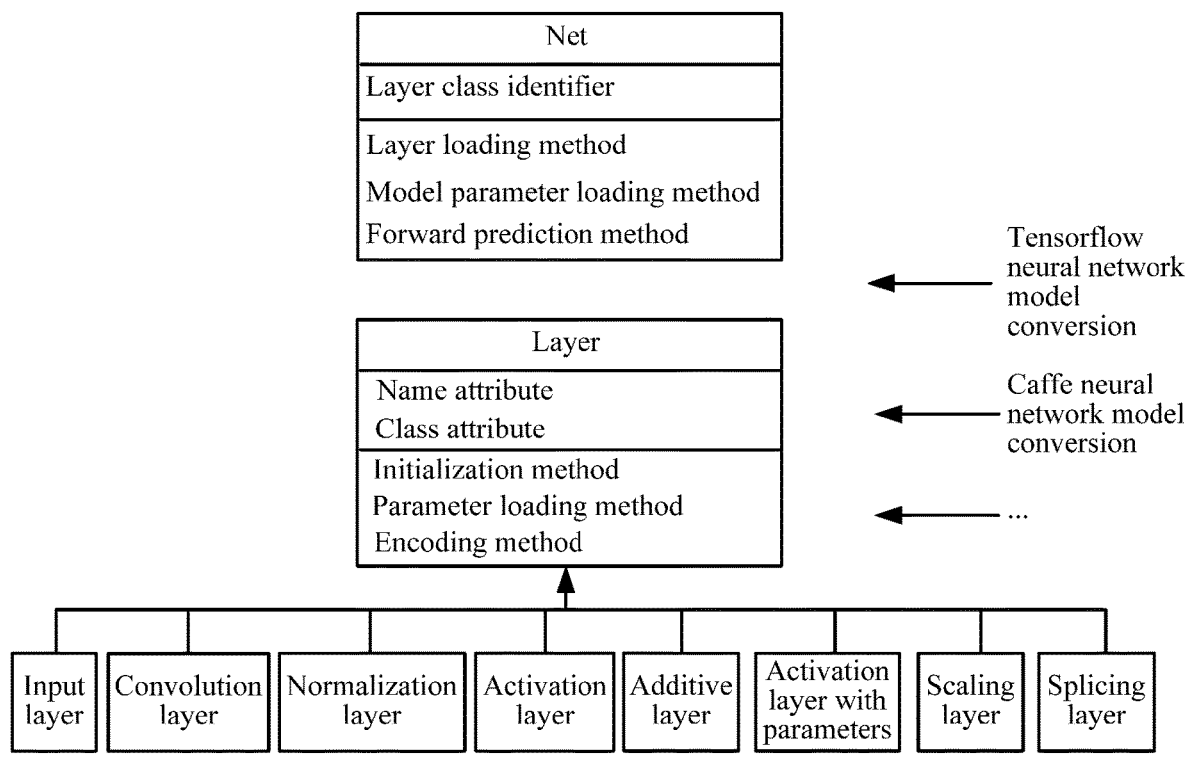
FIG. 4 is a schematic diagram of a framework body of a neural network model according to an embodiment of this application.

Optionally, using a CNN model as an example, FIG. 4 is a schematic diagram of a framework body of neural network models which is applicable to a terminal device according to an embodiment of this application. As shown in FIG. 4, the Layer class may be preset with a name attribute (var name), a Layer class attribute (var class), an initialization method (init), a parameter loading method (load model), and an encode method (a method for encoding a computing task of the current layer and submitting the computing task to a GPU). The Net class is preset with a Layer class identifier (var Layers, configured to indicate a connected Layer class), a layer loading method (add Layer), a model parameter loading method (load model), a method for performing forward prediction (forward), and the like; and Identify, Convolution, BatchNorm, ReLU, Eltwise, PReLU, Resize, and Concat of the CNN network are all inherited from the Layer class.

In the embodiment of this application, by using a framework body shown in FIG. 4, for an initial neural network model trained by using a Tensorflow learning framework, an initial neural network model trained by using Caffe learning framework (which is a convolutional neural network framework), and the like, general deployment of the neural network model into the terminal device can be implemented.

In an example of deploying the initial neural network model trained by using the Tensorflow learning framework into the terminal device, in the embodiment of this application, the initial neural network model trained by using the Tensorflow learning framework may be read, to obtain a model definition file (model.para) and a model parameter file (model.bin). The model definition file record the layer definition of each network layer of the initial neural network model, and the model parameter file may record a target operation parameter obtained after the operating parameter of each network layer is converted into a predetermined format.

According to the layer definition of each network layer, in the terminal device (for example, in the GPU of the terminal device), the target network layer corresponding to each network layer is implemented by using the Layer class, so that each target network layer is inherited from the Layer class. The target network layers are connected by using the Net class, so that the connecting structure of the target network layers corresponds to the connecting structure of the network layers of the initial neural network model. Based on a load model method of the Layer class, the target operation parameter of each network layer recorded in the model parameter file is loaded in the target network layer corresponding to each network layer to obtain the target neural network model, thus implementing deployment of the initial neural network model trained by using the Tensorflow learning framework into the terminal device.

In the embodiments of this application, because each network layer of the initial neural network model may be redefined by using the Layer class, each redefined target network layer is inherited from the Layer class. Moreover, after the target network layers are connected by using the Net class, the corresponding target operation parameter converted into the predetermined format may be loaded in each target network layer, thus reconstructing the initial neural network model needing to be deployed in the terminal device. The corresponding target neural network model is obtained by deployment in the terminal device. Based on the neural network model deployment method provided by the embodiment of this application, by using a uniform framework body of neural network models which is applicable to the terminal device, initial neural network models trained by using different learning frameworks may be redefined in the terminal device, thus implementing general deployment of the initial neural network models trained by using different learning frameworks into the terminal device, and reducing the usage limitation of deployment of the neural network models. Moreover, during neural network model prediction, the neural network model prediction may be directly implemented based on the neural network model deployed in the terminal device, thus providing a basis for improving the speed and real-time performance of neural network model prediction.

Optionally, the neural network model deployment method provided by the embodiment of this application may be applied to the GPU of the terminal device. After the neural network model is deployed into the terminal device, neural network model prediction may be directly implemented in the terminal device by using GPU computing (for example, making the most of parallel calculation of the GPU), thus improving the speed and real-time performance of forward prediction, and realizing forward prediction that is based on the neural network model of the GPU of the terminal device.

Figure 5:
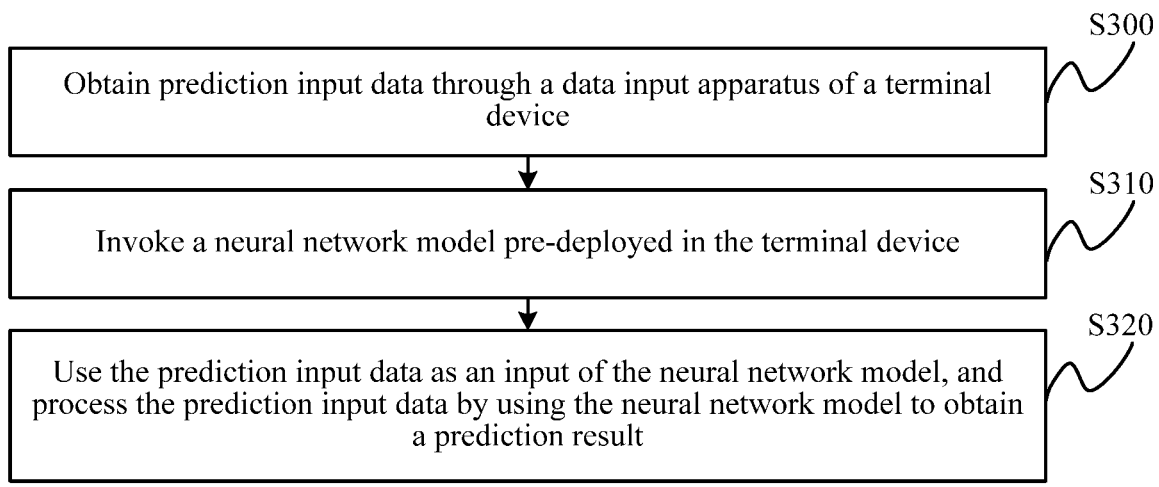
FIG. 5 is a flowchart of a neural network model prediction method according to an embodiment of this application.

Optionally, FIG. 5 is a flowchart of a neural network model prediction method according to an embodiment of this application. The neural network model prediction method shown in FIG. 5 may be applied to a terminal device. Referring to FIG. 5, the neural network model prediction method may include:

Step S300. Obtain prediction input data through a data input apparatus of a terminal device.

The prediction input data may be the input data required for performing neural network model prediction. The prediction input data may be in different forms depending on different functions of neural network models. For example, in a neural network model having a speech analysis function, the prediction input data may be a speech feature of a speech, and in a neural network model having an image recognition function, the prediction input data may be an image feature of an image. Obviously, the prediction input data may be a group of data.

Optionally, the data input apparatus of the terminal device may be an apparatus capable of writing data into the terminal device, for example, a mouse, a keyboard, a network interface, and a touch screen.

Step S310. Invoke a neural network model pre-deployed in the terminal device.

Optionally, the neural network model pre-deployed in the terminal device may be deployed in the terminal device based on the neural network model deployment method provided by the embodiment of this application. In the neural network model pre-deployed in the terminal device, each network layer may be implemented by using a Layer class, so that each network layer is inherited from the Layer class. The network layers are connected by using a Net class. The model is implement by loading a corresponding operation parameter of a predetermined format in each network layer.

Step S320. Use the prediction input data as an input of the neural network model, and process the prediction input data by using the neural network model, to obtain a prediction result.

After the neural network model pre-deployed in the terminal device is invoked, the prediction input data obtained by the terminal device may be used as an input of the neural network model, and the prediction input data is processed by using the neural network model to obtain a prediction result. Optionally, the prediction result may be a classification result or a recognition result.

In the neural network model prediction method provided by the embodiment of this application, prediction input data may be directly processed based on a neural network model pre-deployed in a terminal device during neural network model prediction, thereby directly obtaining a prediction result in the terminal device. An interaction process between the terminal device and a server in the neural network model prediction process is omitted, thus greatly improving the speed and real-time performance of the neural network model.

Optionally, during neural network model prediction, the embodiments of this application can improve a prediction speed based on parallel calculation of a GPU. Using the neural network model being a CNN as an example, in the GPU-based neural network model forward prediction process, the embodiment of this application can also achieve an optimized implementation of the convolution layer of the CNN-form neural network model.

Because a CNN has deep network layers and a large quantity of parameters, after the CNN model is deployed into the terminal device, a large amount of calculation is involved when forward prediction is performed in the GPU of the terminal. Generally, parameters of the convolution layer account for the largest proportion, and the amount of calculation generally accounts for more than 70%. In the conventional implementation of the convolution layer, an efficient method is the im2col+GEMM solution. First, im2col (an algorithm that converts original image data into a matrix) is used to convert the feature maps and filters into a matrix, and then generalized matrix multiplication (GEMINI) is invoked to obtain an inner product the two matrices, so that the convolution operation is transformed into matrix multiplication. In a case of more filters (that is, more channels of feature maps) and a larger filter size, this method achieves higher efficiency. However, in the embodiment of this application, forward prediction of the CNN model is performed in the terminal device. Due to limited computing power of the terminal device, the quantity of channels of feature maps needs to be small. Therefore, if the conventional im2col is used for computing of the convolution layer of the CNN model in the terminal device, the quantity of memory reads is increased.

In this condition, the embodiment of this application can make the most of the parallelism of the GPU. Three dimensions: the width, the height and the output channels of the convolution layer are parallelly scheduled by using the GPU to reduce the quantity of loop layers in implementation of the convolution layer. For example, original six loop layers in implementation of the convolution layer may be reduced to three loop layers.

Optionally, in an example, it is assumed that an input image of the convolution layer is:

input[inputHeight][inputWidth][inputChannels];
filter: filter[outputChannels][filterHeight][filterWidth][inputChannels];
output image: output[outputHeight][outputWidth][outputChannels];

Using stride=1 as an example, six loop layers are required if output is calculated by using a conventional convolution calculation method, and pseudocode may be as shown in FIG. 6. In the embodiment of this application, kernel function pseudocode of the GPU may be as shown in FIG. 7. Original three loop layers: loop 1, loop 2, and loop 3, are calculated and scheduled in parallel by the GPU, leaving only three loop layers of calc_output (oc, y, and x).

Further, in the embodiment of this application, by making full use of a feature of hiding memory latency of GPU computing, the quantity of target points continuously calculated in a loop may be increased. For example, eight target points in one loop are continuously calculated, so that computing cycles in the loop are increased, thus hiding the latency of memory read and write.

Moreover, in the embodiment of this application, during calculation of a first target point, all pixels corresponding to the first target point may be read. During calculation of non-first target points, there are repeated pixels in two adjacent target points. Therefore, during calculation of a non-first target point, pixels the same as those in a previously calculated target point are reused, and pixels different from those in the previously calculated target point are re-read, thus reducing the quantity of memory reads. For example, for a 3×3 convolution, nine adjacent pixels need to be read originally during calculation of one target point, while two adjacent target points have six repeated pixels. In this application, eight adjacent target points are continuously calculated. It only needs to read nine pixels for the first time. Afterwards, six pixels read previously are reused each time, and only three pixels need to be re-read at a time, thus reducing the quantity of memory reads by more than a half.

In an example, for a convolution with a kernel size of 3×3, optimized kernel function pseudocode of the GPU is as shown in FIG. 8. In loop 4 of the convolution, only one point: output[y][x][oc], is calculated. In loop 4 of the convolution 3×3, eight consecutive points of y to y+7 are calculated, and cycles required for calculation in the loop is eight times of original cycles, so that the feature of hiding memory read latency of GPU computing is better utilized. For calculation of each point in the convolution, the input image (filterHeight*filterWidth) needs to be read nine times. In the convolution 3×3, eight adjacent points in the vertical y direction are continuously calculated. Among nine pixels required for calculation of two adjacent points, six points (pixel_line1, pixel_line2) are repeated, and only three new points need to be read each time. In the convolution, the quantity of reads required for calculating eight points is 9*8=72, and in the convolution 3×3, the quantity of reads is 9+3*7=30. The quantity of memory reads is reduced by 58%.

After the optimized implementation of the convolution layer is performed in the embodiment of this application, based on an IOS system, the implementation speed of the convolution layer of the embodiment of this application is compared with implementation speeds in conventional solutions such as Caffe2, Tensorflow, and ncnn. The comparison result is shown in Table 1 below. It can be learned that the speed is increased by 4 to 10 times during implementation of the convolution layer in the embodiment of this application.

TABLE 1

| Unit ms (Millisecond) | This application | Caffe2 | Tensorflow | ncnn |
|---|---|---|---|---|
| 640 × 480 conv2d 3->8 | 9 | 44 | 69 | 36 |
| 640 × 480 conv2d 8->8 | 8 | 105 | 114 | 80 |
| 640 × 480 conv2d 8->3 | 13 | 106 | 127 | 36 |

The embodiment of this application may be applied to deployment of a picture art filter model into an IOS mobile terminal (such as a smart phone having an IOS operating system), and forward prediction based on the deployed picture art filter model in the IOS mobile terminal, so that the picture art filter model trained by using Torch (Torch is a scientific computing framework that widely supports machine learning algorithms) is converted into a model format for the IOS mobile terminal. Therefore, when the picture art filter model is used to add an art filter effect to a picture, the art filter effect is added to the acquired image in the IOS mobile terminal directly based on the picture art filter model deployed in the IOS mobile terminal. Using a CNN model as an example, a specific application process is as follows:

An IOS mobile terminal may read and use a picture art filter model trained by using Torch, convert the model into a predetermined format (for example, convert the model into a binary format) to obtain a definition and a target operation parameter of each network layer of the converted picture art filter model, and acquire a model definition file model.para and a model parameter file model.bin. The model.para defines a structure of the picture art filter model in the CNN form, including the definition of each network layer of the picture art filter model; and the model.bin file includes the target operation parameter corresponding to each network layer.

The IOS mobile terminal invokes a predetermined framework body of a CNN model in a GPU. The framework body defines each network layer of the CNN model by using a Layer class, and the network layers defined by the Layer class are connected by using a Net class.

In the GPU of the IOS mobile terminal, the model definition file model.para is loaded. Each target network layer of the picture art filter model is implemented by using the Layer class, and the target network layers are connected by using the Net class. The model parameter file model.bin is loaded. In the GPU of the IOS mobile terminal, the target operating parameters of the corresponding network layers are loaded into the target network layers to construct a redefined picture art filter model.

Based on the picture art filter model redefined in the GPU of the IOS mobile terminal, when adding an art filter effect to a picture, the IOS mobile terminal can add the art filter effect to the picture according to the picture art filter model redefined in the GPU.

The embodiment of this application can support deployment of neural network models trained by using different training frameworks into a terminal device, for example, support fast deployment of neural network models trained by using learning frameworks such as torch, Tensorflow, and caffe into the terminal device, thus reducing the usage limitation of deployment of the neural network models. General deployment of neural network models trained by using different training frameworks is implemented, thus improving the universality of neural network model deployment. Further, the embodiment of this application may be implemented based on an IOS system, without relying on a third-party library. Code can be written based on IOS native Metal (an application program interface) and an Objective-C language (a programming language), so that the size of the library is greatly reduced. Meanwhile, the embodiment of this application may support abundant layers, and network layers are customized based on the layer class, thus achieving high expansion performance for the network layers of the neural network model. Further, the embodiment of this application can optimize the implementation of the convolution layer based on GPU parallel operating, thus improving the speed of forward prediction of a CNN model.

The following describes a neural network model deployment apparatus provided by the embodiments of this application. The neural network model deployment apparatus described in the following may be considered as program modules that need to be set in the terminal device for implementing the neural network model deployment method provided by the embodiments of this application. The neural network model deployment apparatus described in the following and the neural network model deployment method described above may be referenced to each other.

Figure 9:
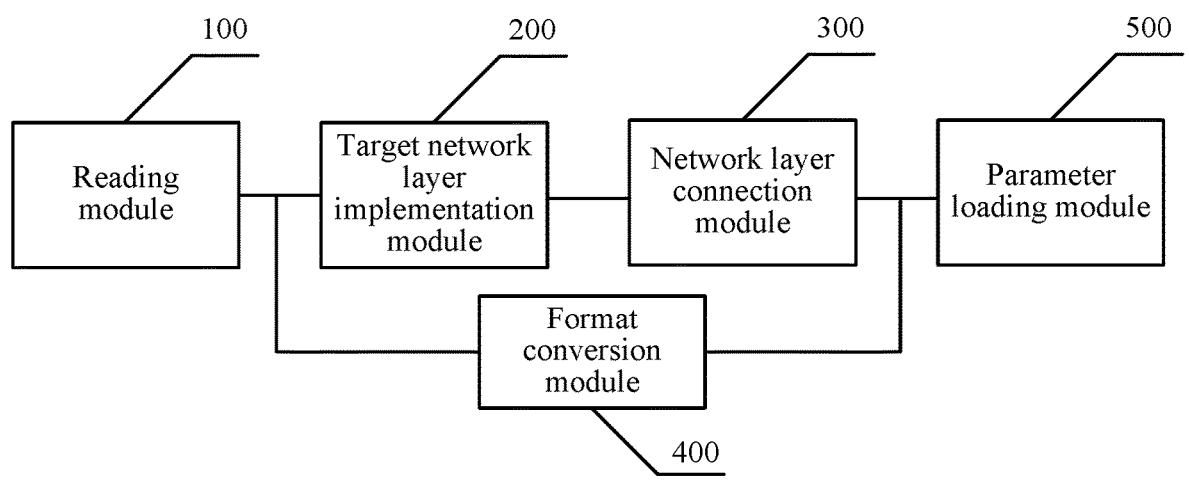
FIG. 9 is a structural block diagram of a neural network model deployment apparatus according to an embodiment of this application.

FIG. 9 is a structural block diagram of a neural network model deployment apparatus according to an embodiment of this application. The device may be applied to a terminal device, and in particular, to a GPU in a terminal device with an IOS operating system. Referring to FIG. 9, the neural network model deployment apparatus provided in the embodiment of this application may include:

a reading module 100, configured to read an initial neural network model to obtain a layer definition of each network layer of the initial neural network model and an operation parameter of each network layer;

a target network layer implementation module 200, configured to implement a target network layer corresponding to each network layer in the terminal device by using a Layer class separately according to the layer definition of each network layer, so that each target network layer is inherited from the Layer class;

a network layer connection module 300, configured to connect the target network layers by using a Net class;

a format conversion module 400, configured to convert the operation parameter of each network layer into a predetermined format, to obtain a target operation parameter of each network layer; and a parameter loading module 500, configured to load a corresponding target operation parameter in the target network layer corresponding to each network layer separately according to the target operation parameter of each network layer, to obtain a target neural network model deployed in the terminal device.

Optionally, a layer definition of a network layer includes: name information, class information, and the initialization information of the network layer; correspondingly, the target network layer implementation module 200 being configured to implement a target network layer corresponding to each network layer in the terminal device by using a Layer class separately according to the layer definition of each network layer so that each target network layer is inherited from the Layer class specifically includes:

for any network layer of the initial neural network model, adjusting, in the terminal device by using the Layer class as a base class, a preset name attribute of the Layer class according to the name information of the network layer, adjusting a preset Layer class attribute of the Layer class according to the class information of the network layer, and performing, according to the initialization information of the network layer, an initialization operation by using a preset initialization method of the Layer class, to obtain the target network layer corresponding to each network layer, so that each obtained target network layer is a derived class of the Layer class.

Optionally, the parameter loading module 500 being configured to load a corresponding target operation parameter in the target network layer corresponding to each network layer separately according to the target operation parameter of each network layer, to obtain a target neural network model deployed in the terminal device specifically includes:

loading the corresponding target operation parameter in the target network layer corresponding to each network layer by using a preset parameter loading method of the Layer class separately according to the target operation parameter of each network layer, to obtain the target neural network model deployed in the terminal device.

Optionally, the network layer connection module 300 being configured to connect the target network layers by using a Net class specifically includes:

connecting the target network layers by using the Net class according to a connecting structure of the network layers of the initial neural network model, so that a connecting structure of the target network layers corresponds to the connecting structure of the network layers of the initial neural network model.

Figure 10:
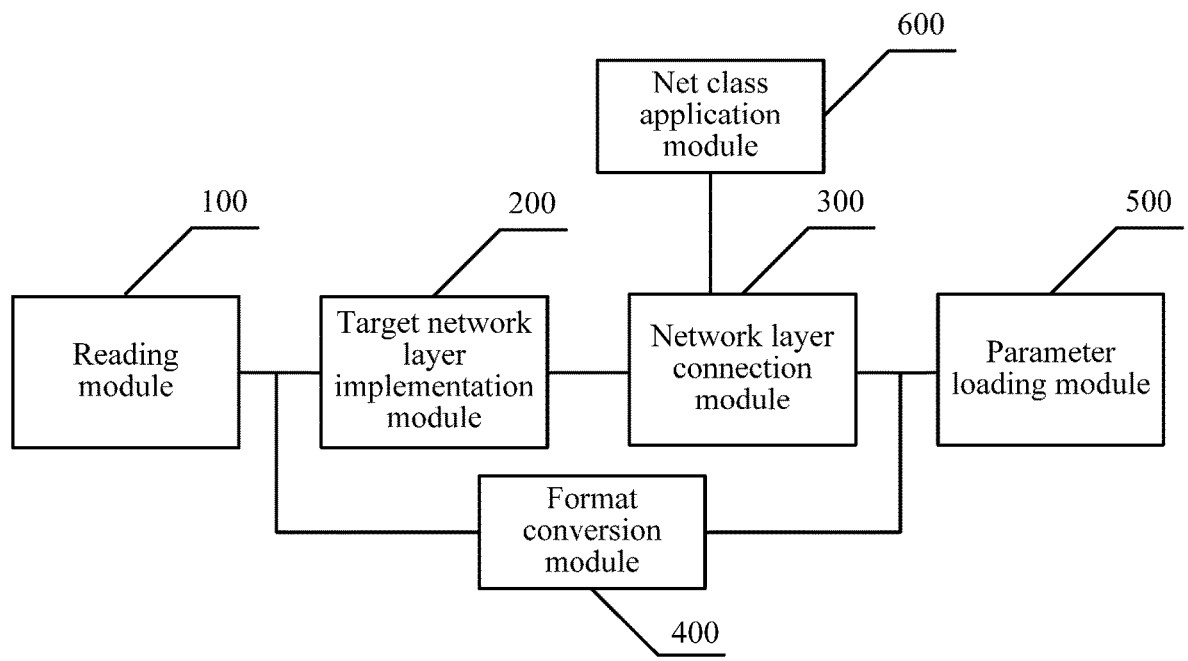
FIG. 10 is another structural block diagram of a neural network model deployment apparatus according to an embodiment of this application.

Optionally, FIG. 10 is another structural block diagram of a neural network model deployment apparatus according to an embodiment of this application. With reference to FIG. 9 and FIG. 10, the apparatus may further include:

a Net class application module 600, configured to add a network layer to the target neural network model by using a preset network layer adding method of the Net class, where the added network layer is inherited from the Layer class; and/or, read and load, by using a preset parameter reading method of the Net class, a parameter required for operating the target neural network model; and/or, operating the target neural network model by using a preset prediction method of the Net, to perform forward prediction.

Figure 11:
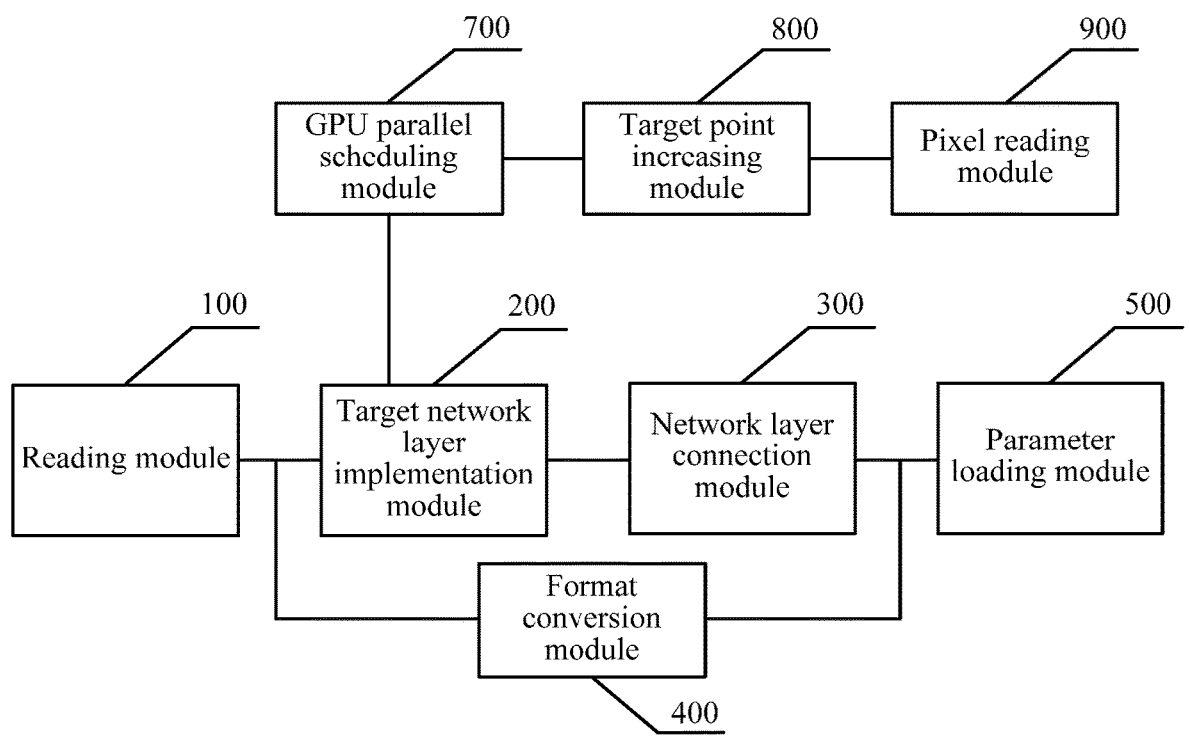
FIG. 11 is still another structural block diagram of a neural network model deployment apparatus according to an embodiment of this application.

Optionally, the initial neural network model is a CNN model; correspondingly, FIG. 11 is still another structural block diagram of a neural network model deployment apparatus according to an embodiment of this application. With reference to FIG. 9 and FIG. 11, the apparatus may further include:

a GPU parallel scheduling module 700, configured to schedule three dimensions in parallel: a width, a height and an output channel, of a convolution layer of the CNN model by using a GPU of the terminal device, to reduce a quantity of loop layers in implementation of the convolution layer;

a target point increasing module 800, configured to increase a quantity of target points continuously calculated in a loop; and a pixel reading module 900, configured to read, curing calculation of a first target point, all pixels corresponding to the first target point; and reuse pixels the same as those in a previously calculated target point and re-read pixels different from those in the previously calculated target point during calculation of a non-first target point.

Optionally, the GPU parallel scheduling module 700 may be separately applied to the apparatus shown in FIG. 8 or FIG. 9.

After the deployed target neural network model is obtained in the terminal device, in the embodiment of this application, neural network model prediction may be performed by using the target neural network model deployed in the terminal device. For example, the terminal device may obtain input data, invoke the target neural network model deployed in the terminal device (for example, the target neural network model deployed in the GPU of the terminal device) perform calculation on the input data, and determine a classification or recognition result of the input data.

Figure 12:
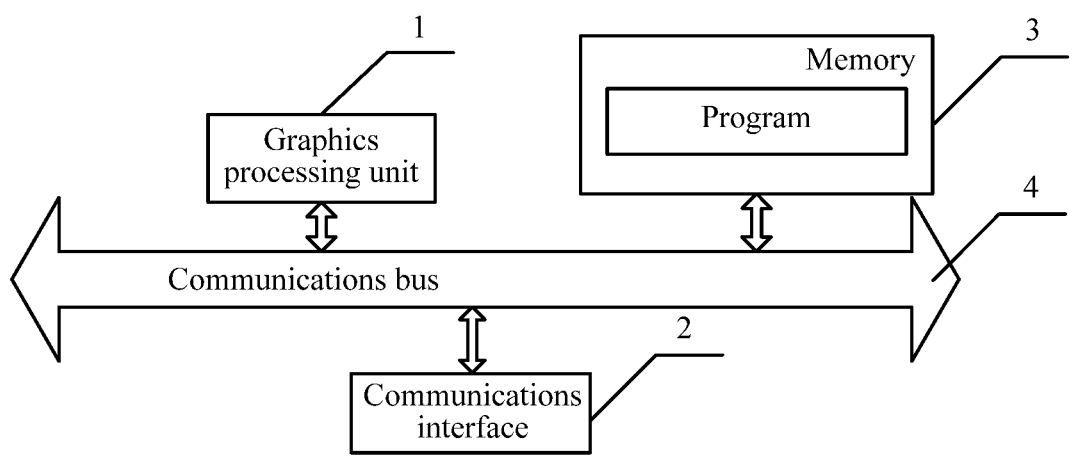
FIG. 12 is a block diagram of a hardware structure of a terminal device according to an embodiment of this application.

The neural network model deployment apparatus provided by the embodiment of this application may be applied to a terminal device. Optionally, FIG. 12 shows a hardware structure of a terminal device. Referring to FIG. 12, the terminal device may include: at least one the graphics processing unit 1, at least one communications interface 2, at least one memory 3 and at least one communications bus 4.

In the embodiment of this application, at least one graphics processing unit 1, at least one communications interface 2, at least one memory 3 and at least one communications bus 4 are provided. The graphics processing unit 1, the communications interface 2, and the memory 3 communicate with each other through the communications bus 4.

The memory stores a program. When the graphics processing unit invokes the program stored in the memory, the steps of the foregoing neural network model deployment method may be implemented.

Optionally, the program may be configured to:

read an initial neural network model to obtain a layer definition of each network layer of the initial neural network model and an operation parameter of each network layer;

implement, by using a Layer class, a target network layer corresponding to each network layer in the terminal device separately according to the layer definition of each network layer, so that each target network layer is inherited from the Layer class;

connect the target network layers by using a Net class;

convert the operation parameter of each network layer into a predetermined format, to obtain a target operation parameter of each network layer; and load a corresponding target operation parameter in the target network layer corresponding to each network layer separately according to the target operation parameter of each network layer, to obtain a target neural network model deployed in the terminal device.

Optionally, for detailed functions and extended functions of the program, reference may be made to the corresponding part above.

An embodiment of this application further provides a storage medium, such as a memory. The storage medium stores a program suitable to be executed by a graphics processing unit. The program, when executed by the graphics processing unit, implements the steps of the foregoing neural network model deployment method.

Optionally, the program may be configured to:

read an initial neural network model to obtain a layer definition of each network layer of the initial neural network model and an operation parameter of each network layer;

implement, by using a Layer class, a target network layer corresponding to each network layer in the terminal device separately according to the layer definition of each network layer, so that each target network layer is inherited from the Layer class;

connect the target network layers by using a Net class;
convert the operation parameter of each network layer into a predetermined format, to obtain a target operation parameter of each network layer; and
load a corresponding target operation parameter in the target network layer corresponding to each network layer separately according to the target operation parameter of each network layer, to obtain a target neural network model deployed in the terminal device.

Optionally, for detailed functions and extended functions of the program, reference may be made to the corresponding part above.

Figure 13:
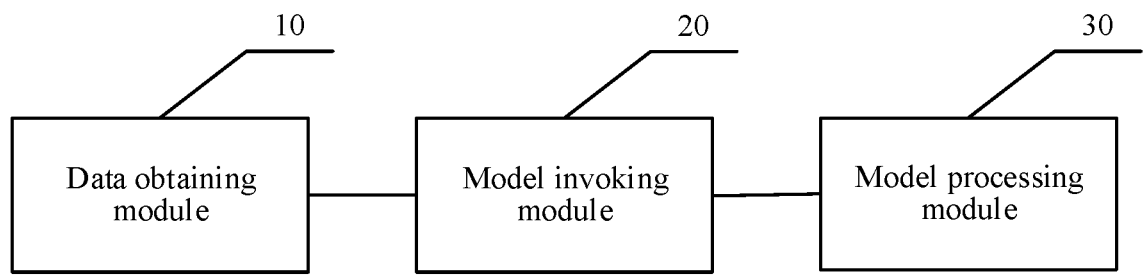
FIG. 13 is a structural block diagram of a neural network model prediction apparatus according to an embodiment of this application.

An embodiment of this application further provides a neural network model prediction apparatus. After a neural network model is deployed to a terminal device by using the neural network model deployment apparatus provided by the embodiments of this application, the neural network model deployed in the terminal device realizes neural network model prediction. FIG. 13 is a structural block diagram of a neural network model prediction apparatus according to an embodiment of this application. The apparatus may be applied to a terminal device, and in particular, to a GPU in a terminal device with an IOS operating system. Referring to FIG. 13, the neural network model prediction apparatus provided by the embodiment of this application may include:

a data obtaining module 10, configured to obtain prediction input data through a data input apparatus of the terminal device;

a model invoking module 20, configured to invoke a neural network model pre-deployed in the terminal device; and a model processing module 30, configured to use the prediction input data as an input of the neural network model, and process the prediction input data by using the neural network model, to obtain a prediction result.

Optionally, the neural network model may be a CNN model. The model processing module 30 being configured to process the prediction input data by using the neural network model may specifically include:

scheduling three dimensions in parallel: a width, a height and an output channel, of a convolution layer of the CNN model by using a GPU of the terminal device during processing of the prediction input data, to reduce a quantity of loop layers in implementation of the convolution layer.

Optionally, the model processing module 30 being configured to process the prediction input data by using the neural network model, may further include:

increasing a quantity of target points continuously calculated in a loop;

reading, during calculation of a first target point, all pixels corresponding to the first target point; reusing pixels the same as those in a previously calculated target point and re-reading pixels different from those in the previously calculated target point during calculation of a non-first target point.

Optionally, an embodiment of this application further provides a terminal device. A hardware structure of the terminal device may be as shown in FIG. 12, and the terminal may include: at least one the memory and at least one the graphics processing unit. The memory stores a program, and in a case that the graphics processing unit invokes the program stored in the memory, the steps of the neural network model prediction method described above are implemented.

Optionally, the program may be configured to:
obtain prediction input data through a data input apparatus of the terminal device;
invoke a neural network model pre-deployed in the terminal device;
use the prediction input data as an input of the neural network model, and process the prediction input data by using the neural network model to obtain a prediction result.

Optionally, an embodiment of this application further provides a storage medium. The storage medium stores a program suitable to be executed by a graphics processing unit, and the program is configured to:
obtain prediction input data through a data input apparatus of a terminal device;
invoke a neural network model pre-deployed in the terminal device;
use the prediction input data as an input of the neural network model, and process the prediction input data by using the neural network model to obtain a prediction result.

Optionally, for detailed functions and extended functions of the program, reference may be made to the corresponding part above.

The embodiments in the specification are all described in a progressive manner. Each embodiment focuses on a difference from other embodiments. For the same or similar parts in the embodiments, reference is made to each other. The apparatus disclosed in the embodiments is described relatively simply because it corresponds to the method disclosed in the embodiments. For parts related to the method, refer to the description of the method.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described components and steps of each example according to functions. Whether the functions are performed by using hardware or software depends on particular applications and design constraint conditions of the technical solutions. A person skilled in the art may use different methods to implement the described functions for each particular application, but such an implementation is not to be considered as beyond the scope of this application.

In combination with the embodiments disclosed in this specification, method or algorithm steps may be implemented by hardware, a software module executed by a processor, or a combination thereof. The software module may reside in a random-access memory (RAM), a memory, a read-only memory (ROM), an electrically programmable ROM, an electrically erasable programmable ROM, a register, a hard disk, a removable disk, a CD-ROM, or any other form of storage medium known in the art.

The embodiments disclosed above are described to help a person skilled in the art to implement or use this application. Various modifications made to the embodiments are obvious to a person skilled in the art, and the general principles defined herein may also be implemented in other embodiments without departing from the core spirit or scope of this application. Therefore, this application is not limited to the embodiments described herein, but shall conform to the widest scope consistent with the principles and novel features disclosed herein.

What is claimed is:

1. A neural network model deployment method, applied to a terminal device, the method comprising:
reading an initial neural network model, wherein the initial neural network model comprises a convolutional neural network (CNN) model;
obtaining a layer definition of each network layer of the initial neural network model;
obtaining trained model parameters of each network layer of the initial neural network model;
executing, by using a layer class, a target network layer corresponding to each network layer in the terminal device separately according to the layer definition of each network layer, so that each target network layer is inherited from the layer class;
applying relational connections amongst the target network layers using a net class;
converting the trained model parameters of each network layer into a preset format different from their original format;
obtaining target model parameters of each network layer based on the preset format;
loading corresponding target model parameters in the target network layer corresponding to each network layer separately according to the target model parameters of each network layer;
obtaining a target neural network model for deployment in the terminal device based on the target model parameters of each network layer; and
deploying the target neural network model in the terminal device by:
identifying, in the target neural network model, a convolution layer for generation of OC channels of output feature maps from IC channels of input feature maps based on OC convolutional kernels, each of the input feature maps and output feature maps comprise W by H pixels, OC, IC, W, and H being positive integers, W and H being pixel width and pixel height of each of the input feature maps and output feature maps; and
deploying the convolutional layer to calculate each of the W*H pixels of each of the OC channels of output feature maps by performing convolution with a kernel corresponding to the each of the OC channels in a GPU, wherein the convolutions for pixels of the OC channels of output feature maps are computed in parallel between every at least 8 adjacent pixels in each of the OC channels of output feature map but consecutively for each pixel within the every at least 8 adjacent pixels in order to reduce an average number of memory reads needed for calculating each pixel of the output feature maps by at least a factor of 2 in comparison to calculating the convolutions of all pixels in each of OC output feature maps in parallel.

2. The neural network model deployment method according to claim 1, wherein a layer definition of a network layer comprises: name information, class information, and initialization information of the network layer; and
wherein the executing, by using the layer class, the target network layer corresponding to each network layer in the terminal device separately according to the layer definition of each network layer, so that each target network layer is inherited from the layer class comprises:
adjusting, for any network layer of the initial neural network model and by using the layer class as a base class in the terminal device, a preset name attribute of the layer class according to the name information of the network layer;
adjusting a preset layer class attribute of the layer class according to the class information of the network layer; and
performing, according to the initialization information of the network layer, an initialization operation by using a preset initialization method of the layer class, to obtain the target network layer corresponding to each network layer, so that each obtained target network layer is a derived class of the layer class.

3. The neural network model deployment method according to claim 1, wherein the loading the corresponding target model parameters in the target network layer corresponding to each network layer separately according to the target model parameters of each network layer comprises:
loading the corresponding target model parameters in the target network layer corresponding to each network layer by using a preset parameter loading method of the layer class separately according to the target model parameters of each network layer.

4. The neural network model deployment method according to claim 1, wherein the connecting the target network layers by using the net class comprises:
connecting the target network layers by using the net class according to a connecting structure of the network layers of the initial neural network model, so that a connecting structure of the target network layers corresponds to the connecting structure of the network layers of the initial neural network model.

5. The neural network model deployment method according to claim 4, further comprising:
adding a network layer to the target neural network model by using a preset network layer adding method of the net class, wherein the added network layer is inherited from the layer class; and/or
reading and loading, by using a preset parameter reading method of the net class, a parameter required for operating the target neural network model; and/or
operating the target neural network model by using a preset prediction method, to perform forward prediction.

6. The neural network model deployment method according to claim 1, further comprising:
reading, during calculation of a first target point of the at least 8 adjacent pixels, all pixels corresponding to the first target point at one time; and
reusing pixels that are the same as those in a previously calculated target point of the at least 8 adjacent pixels and re-reading pixels different from those in the previously calculated target point during calculation of a non-first target point at a different time.

7. A neural network model deployment terminal device, comprising a memory for storing computer instructions and a processor, wherein the processor, when executing the computing instructions, is configured to cause the terminal device to:
read an initial neural network model, wherein the initial neural network model comprises a convolutional neural network (CNN) model; and
obtain a layer definition of each network layer of the initial neural network model;
obtain trained model parameters of each network layer of the initial neural network model;
execute, by using a layer class, a target network layer corresponding to each network layer in the terminal device separately according to the layer definition of each network layer, so that each target network layer is inherited from the layer class;

apply relational connections amongst the target network layers using a net class;

convert the trained model parameters of each network layer into a format different from their original format, to obtain target model parameters of each network layer;

load corresponding target model parameters in the target network layer corresponding to each network layer separately according to the target model parameters of each network layer;

obtain a target neural network model deployed in the terminal device based on the target model parameters of each network layer; and deploy the target neural network model in the terminal device by:

identifying, in the target neural network model, a convolution layer for generation of OC channels of output feature maps from IC channels of input feature maps based on OC convolutional kernels, each of the input feature maps and output feature maps comprise W by H pixels, OC, IC, W, and H being positive integers, W and H being pixel width and pixel height of each of the input feature maps and output feature maps; and deploying the convolutional layer to calculate each of the W*H pixels of each of the OC channels of output feature maps by performing convolution with a kernel corresponding to the each of the OC channels in a GPU, wherein the convolutions for pixels of the OC channels of output feature maps are computed in parallel between every at least 8 adjacent pixels in each of the OC channels of output feature map but consecutively for each pixel within the every at least 8 adjacent pixels in order to reduce an average number of memory reads needed for calculating each pixel of the output feature maps by at least a factor of 2 in comparison to calculating the convolutions of all pixels in each of OC output feature maps in parallel.

8. The neural network model deployment terminal device according to claim 7, wherein a layer definition of a network layer comprises: name information, class information, and initialization information of the network layer; and wherein the processor is further configured to execute the computer instructions to cause the terminal device to:

adjust, for any network layer of the initial neural network model and by using the layer class as a base class in the terminal device, a preset name attribute of the layer class according to the name information of the network layer;

adjust a preset layer class attribute of the layer class according to the class information of the network layer; and perform, according to the initialization information of the network layer, an initialization operation by using a preset initialization method of the layer class, to obtain the target network layer corresponding to each network layer, so that each obtained target network layer is a derived class of the layer class.

9. The neural network model deployment terminal device according to claim 7, wherein the processor is further configured to execute the computer instructions to cause the terminal device to:

load the corresponding target model parameters in the target network layer corresponding to each network layer by using a preset parameter loading method of the layer class separately according to the target model parameters of each network layer.

10. The neural network model deployment terminal device according to claim 7, wherein the processor is further configured to execute the computer instructions to cause the terminal device to:

connecting the target network layers by using the net class according to a connecting structure of the network layers of the initial neural network model, so that a connecting structure of the target network layers corresponds to the connecting structure of the network layers of the initial neural network model.

11. The neural network model deployment terminal device according to claim 10, wherein the processor is further configured to execute the computer instructions to cause the terminal device to:

add a network layer to the target neural network model by using a preset network layer adding method of the net class, wherein the added network layer is inherited from the layer class; and/or read and load by using a preset parameter reading method of the net class, a parameter required for operating the target neural network model; and/or operate the target neural network model by using a preset prediction method of the net class, to perform forward prediction.

12. The neural network model deployment terminal device according to claim 7, wherein the processor is further configured to execute the computer instructions to cause the terminal device to:

read, during calculation of a first target point of the at least 8 adjacent pixels, all pixels corresponding to the first target point at one time; and reuse pixels that are the same as those in a previously calculated target point of the at least 8 adjacent pixels and re-reading pixels different from those in the previously calculated target point during calculation of a non-first target point at a different time.

13. A non-transitory computer-readable medium configured to store instructions that, when executed, causes a processing circuitry to:

read an initial neural network model, wherein the initial neural network model comprises a convolutional neural network (CNN) model; and obtain a layer definition of each network layer of the initial neural network model;

obtain trained model parameters of each network layer of the initial neural network model;

execute, by using a layer class, a target network layer corresponding to each network layer in a terminal device separately according to the layer definition of each network layer, so that each target network layer is inherited from the layer class;

apply relational connections amongst the target network layers using a net class;

convert the trained model parameters of each network layer into a predetermined format different from their original format, to obtain target model parameters of each network layer;

load corresponding target model parameters in the target network layer corresponding to each network layer separately according to the target model parameters of each network layer;

obtain a target neural network model deployed in the terminal device based on the target model parameters of each network layer; and deploy the target neural network model in the terminal device by:

identifying, in the target neural network model, a convolution layer for generation of OC channels of output feature maps from IC channels of input feature maps based on OC convolutional kernels, each of the input feature maps and output feature maps comprise W by H pixels, OC, IC, W, and H being positive integers, W and H being pixel width and pixel height of each of the input feature maps and output feature maps; and deploying the convolutional layer to calculate each of the W*H pixels of each of the OC channels of output feature maps by performing convolution with a kernel corresponding to the each of the OC channels in a GPU, wherein the convolutions for pixels of the OC channels of output feature maps are computed in parallel between every at least 8 adjacent pixels in each of the OC channels of output feature map but consecutively for each pixel within the every at least 8 adjacent pixels in order to reduce an average number of memory reads needed for calculating each pixel of the output feature maps by at least a factor of 2 in comparison to calculating the convolutions of all pixels in each of OC output feature maps in parallel.

14. The non-transitory computer-readable medium of claim 13, wherein a layer definition of a network layer comprises: name information, class information, and initialization information of the network layer.

* * * * *